(12) United States Patent
Postrel

(10) Patent No.: US 8,583,506 B2
(45) Date of Patent: Nov. 12, 2013

(54) METHOD AND SYSTEM FOR IMPLEMENTING AN ONLINE PURCHASE TRANSACTION WITH REWARDS

(75) Inventor: Richard Postrel, Miami Beach, FL (US)

(73) Assignee: Signature Systems LLC, Miami Beach, FL (US)

( * ) Notice: Subject to any disclaimer, the term of this patent is extended or adjusted under 35 U.S.C. 154(b) by 274 days.

(21) Appl. No.: 13/277,278

(22) Filed: Oct. 20, 2011

(65) Prior Publication Data

US 2012/0130789 A1 May 24, 2012

Related U.S. Application Data

(63) Continuation of application No. 12/103,487, filed on Apr. 15, 2008, now Pat. No. 8,078,496, which is a continuation of application No. 11/061,095, filed on Feb. 19, 2005, now Pat. No. 7,512,551, which is a continuation-in-part of application No. 10/601,317, filed on Jun. 20, 2003, now Pat. No. 6,947,898, which is a continuation of application No. 09/602,222, filed on Jun. 23, 2000, now Pat. No. 6,594,640.

(60) Provisional application No. 60/140,603, filed on Jun. 23, 1999, provisional application No. 60/548,373, filed on Feb. 27, 2004.

(51) Int. Cl.
*G06Q 30/00* (2012.01)

(52) U.S. Cl.
USPC .................................. 705/26.1; 705/27.1

(58) Field of Classification Search
USPC ................................... 705/26.1, 27.1
See application file for complete search history.

(56) References Cited

U.S. PATENT DOCUMENTS

| 7,136,853 B1 * | 11/2006 | Kohda et al. ............ 1/1 |
| 2006/0010033 A1 | 1/2006 | Thomas | |

* cited by examiner

*Primary Examiner* — James Zurita
(74) *Attorney, Agent, or Firm* — Barkume & Associates, P.C.

(57) ABSTRACT

A system and method for implementation of product searches via a search engine over a networked computer system such as the Internet. In particular, a user may execute a search for product offers that are accompanied with reward components (e.g. reward points, rebates, coupons, etc.) and/or those that allow payment in whole or in part with payment components (e.g. reward points, rebates, coupons, etc.).

6 Claims, 9 Drawing Sheets

Account: John Doe
Account Number: 123456789
Enrollment Date: 12-21-1995
Privilege Card Type: Preferred
Total Miles: 12,058
Non-Equity Miles: 967
Equity Miles:
Miles Available for Award Redemption: 11,025

| Activity Date | Type | Origin | Destination | Class | Flight No. | Description | Miles |
|---|---|---|---|---|---|---|---|
| 06-06-1999 | Other Activity | | | | | Hotel | 700 |
| 05-31-1999 | Other Activity | | | | | Credit | 2,725 |
| 05-21-1999 | Other Activity | | | | | Phone | 252 |
| 05-19-1999 | Statement Issued | | | | | STMT BAL | 7,348 |
| 05-18-1999 | Flight | LAX | LGA | Y | 701 | | 2300 |
| 05-16-1999 | Flight | LGA | LAX | Y | 801 | | 2300 |
| 05-16-1999 | Other Activity | | | | | Car Rental | 420 |
| 05-03-1999 | Other Activity | | | | | Hotel | 700 |
| 04-30-1999 | Other Activity | | | | | Credit | 2,908 |
| 04-21-1999 | Other Activity | | | | | Phone | 385 |
| 03-31-1999 | Other Activity | | | | | Credit | 1,870 |
| 02-28-1999 | Flight | LAX | LGA | Y | 701 | | 2300 |
| 02-21-1999 | Flight | LGA | LAX | Y | 801 | | 2300 |

FIG.3  PRIOR ART

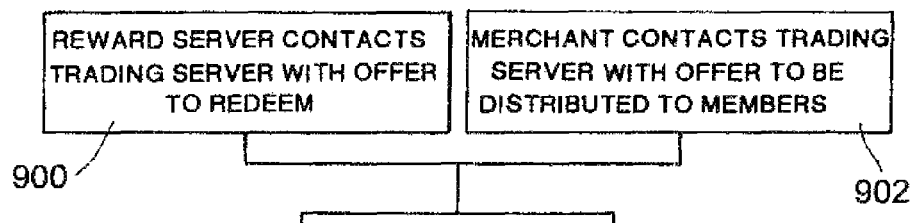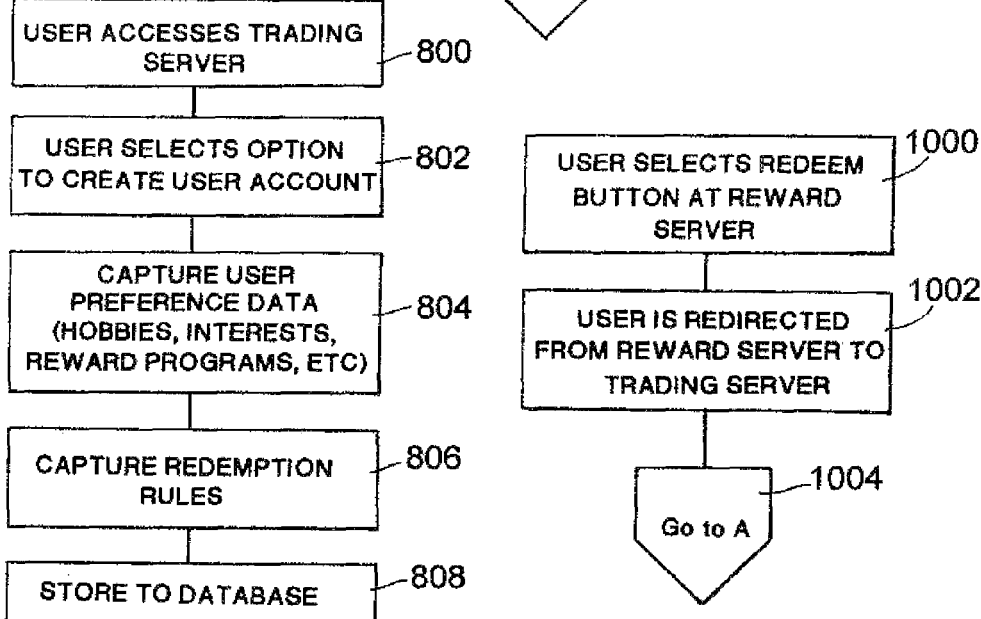

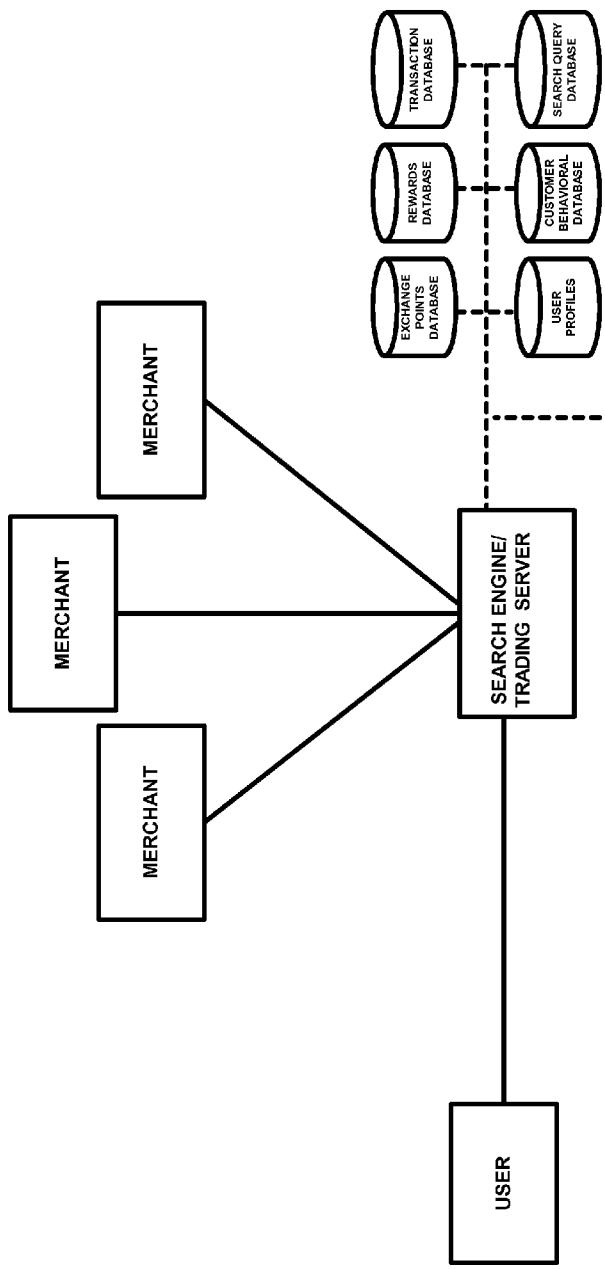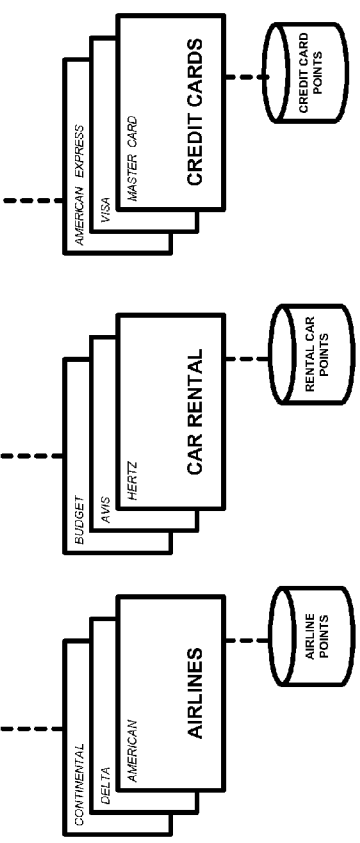
FIGURE 11

METHOD AND SYSTEM FOR IMPLEMENTING AN ONLINE PURCHASE TRANSACTION WITH REWARDS

CROSS-REFERENCE TO RELATED APPLICATIONS

This application is a continuation application of Ser. No. 12/103,487 filed Apr. 15, 2008, which is a continuation application of application Ser. No. 11/061,095 filed Feb. 19, 2005 now U.S. Pat. No. 7,512,551; which claims the benefit of U.S. provisional patent application Ser. No. 60/548,373 filed on Feb. 27, 2004, and which is a continuation-in-part application of application Ser. No. 10/601,317 filed on Jun. 20, 2003 now U.S. Pat. No. 6,947,898, which is a continuation of application Ser. No. 09/602,222 filed Jun. 23, 2000 now U.S. Pat. No. 6,594,640, which claims the benefit of U.S. provisional patent application Ser. No. 60/140,603 filed on Jun. 23, 1999.

BACKGROUND OF THE INVENTION

The present invention allows a user to obtain product information from a search engine and pay for found products with reward points from individual reward accounts or aggregated reward points or a combination of reward points and other consideration such as cash, coupons, and/or a credit card.

Due to the wide reaching presence of the Internet, consumers are able to conduct transactions with virtually any entity having a web server or other presence on the Internet. Consumers are thus faced with countless opportunities to (1) collect value ("reward components") as a result of performing certain transactions or other Internet-based actions, and (2) redeem such collected value ("payment components") in exchange for products and service offered by merchants on the Internet. As used herein, the term "product" refers to any tangible item (e.g. a DVD) or intangible item (e.g. a property right) as well as a service (e.g. landscaping services) that may be performed for the consumer. A merchant is anyone that supplies a product to a consumer or user.

Thus, due to the multitude of available opportunities to either obtain value or redeem value, there is a need to provide consumers with a means for finding desired opportunities and offers via the Internet. The prior art provides simple searching tools such as search engines provided by GOGGLE, MICROSOFT and YAHOO, but does not adequately address the current needs of consumers as described herein.

A reward component of a transaction may be defined as any value conveyed by a merchant or other entity to the consumer or user as an incentive for executing a transaction, performing an activity, etc. A typical example of a reward component is the awarding of reward points for making a purchase, such as when AMERICAN EXPRESS awards 500 Membership Rewards points for making a $500 purchase with an AMERICAN EXPRESS card, or when The GAP awards 50 GAP Reward Points for making a $50 purchase at a GAP store. Other reward components include rebates, discount coupons, or any cash equivalent tender). It is noted that a reward component may be an intangible perceived value in addition to real values listed above.

Likewise, a payment component is essentially a reward component that is being used as payment in whole or in part for a product from a merchant. Thus, a consumer uses a payment component to pay for a DVD that costs $20 when he redeems 2,000 reward points (each worth one cent in this example) with the merchant. Likewise, the consumer may redeem previously accrued rebates, coupons, etc.

Reward points (also referred to as frequent flyer miles) are used as an increasingly common form of both reward components and payment components in consumer as well as business transactions. That is, in order to attract and retain business customers, airlines, hotels, car rental companies, chain retailers, telecom providers, etc. have historically introduced frequent use programs that offer awards of reward points, frequent flyer miles or other such incentives schemes based on the distance traveled or use by that customer. Success has enabled airlines to modify the manner in which mileage was acquired to include travel related purchases by consumers. For example, the dollar-based cost of a hotel stay may be awarded as reward points or mileage to a client account. Within the past several years, credit card companies or other retailers and retailers have co-branded credit cards in the name of the airlines and the credit card company where each dollar spent using the card is recorded as a mile of travel or point in the award program or some monetary value assigned by the issuer. These cards may additionally award bonus miles in coordination with user purchases of preferred products or flights during preferred times.

With regard to FIG. 1, a model of the frequent flyer systems of the prior art is presented. Two different airlines servers are shown surrounded by their related marketing partners, the first grouping labeled Airline 1 100 and the second independently operated but functionally similar grouping labeled Airline 2 200. In order to lure more business travelers, the airlines 100, 200 have established marketing agreements with travel related companies to provide the business traveler with a more robust way to generate rewards in the form of frequent flyer miles. These marketing arrangements or associations have typically involved credit card companies, phone companies, hotel chains and car rental companies. Any purchases made through these "co-branded" partners were then awarded to the user periodically. Bonus miles or points may additionally be accumulated based on the user's actions in response to offers made by the airline or in coordination with the partner company. For example, phone companies offer bonus miles to users based on the user's agreement to change phone service. These points are obtained by the partner companies by purchasing them from the issuing entity for redistribution as an incentive to utilize their particular goods and/or services. FIG. 2 shows some sample co-branded cards that are representative of marketing agreements between TWA, Sprint, and Mastercard. In order to receive these benefits, the user must sign up with each of the partner companies separately and provide the frequent flyer account number that is to receive the credited miles. A user either making phone calls or purchases in accordance with the agreements made with each of these partners will first accumulate a value on the partner's system which in turn is periodically updated on the airline reward server to reflect the value earned during that period. FIG. 3 is representative of a typical user account that shows various earnings in the system transferred in from any of the co-branded partners. The records of the table in FIG. 3 identify the source of the rewards, the dates they were recorded and the number of miles associated with that transaction. The user can view the accumulated miles by accessing the airline reward server or by tracking the individual value reported to the user through the various bills the user receives from each of the co-branded partners.

The prior art does not provide for a consumer to utilize relatively small amounts of reward points in any manner. In addition, a consumer often can only redeem points in an airline-related manner (i.e. to obtain a free ticket or upgrade from coach to first class). This prior art does not recognize the need for a consumer to exchange reward points for non-travel related goods, and in particular renders relatively small numbers of points useless. For example, a consumer that does not travel often may have 500 points in United Airlines, 700 points in USAir, and 1000 points in TWA, each of which is relatively useless in the prior art.

What is desired, therefore, is a system where users may submit reward points or credits accumulated for other types of transactions for redemption or translation into a form readily acceptable by a participating merchant. A user should be able to pool or aggregate the various earned rewards that may exist in currently separate reward server systems where the resulting combined value may be used by a user of the system to acquire items of equivalent or relative value. A user who has earned frequent flyer miles or rewards from several points issuers that, individually, are insufficient to receive any direct value for their mileage may be able to pool the miles acquired from several different points issuers to transfer the awards accumulated to the trading system of this invention. The user may have the selected items delivered by performing a purchase request by various means such as a product search over the Internet, dialing a toll free number for placing an order, or any other means of placing an order that will accept payment from this system.

It is also desired to provide a product search engine integrated with or adjunct to the reward points aggregation aspect of this invention to enable a user to easily find a desired product with a search of a plurality of resources such as the Internet and then pay for a product found in the search with reward points from individual reward accounts as well as aggregated reward points from an exchange account.

SUMMARY OF THE INVENTION

This invention allows a user to execute a search for products (goods or services) over a networked computer system such as the Internet and pay for the found products in whole or in part using a payment component such as reward points from individual reward points accounts as well as accumulated reward points held by a variety of award programs or co-branded partners (wherein individual accounts may or may not be maintained) that are aggregated into an exchange account. The present invention also allows users to execute a search over the Internet for offers of reward components, such as reward points, rebates, coupons, etc. for accumulation and subsequent redemption.

The user executes a product search using a search engine that accepts a user query and returns hits that link the user to merchant web sites that offer reward components and/or accept payment components for the desired product. The user may then consummate a purchase transaction with a merchant directly in the event that the merchant accepts payment components directly (e.g. a button may appear on the merchant's web site indicating payment with reward points from a single account or an aggregated points account). Or, in another embodiment, the user may utilize a payment process provided by the search engine that allows the search engine to broker the transaction with the merchant or other third party and pay for the product with cash consideration (or its equivalent) in exchange for redemption of the payment component (e.g. by reducing the user's reward points in his account with the search engine). The user may also have a search option that indicate she only wants to see web pages from merchants that will accept reward points to pay for the products.

In particular, as specified herein, the present invention is a method for executing an online search over a networked computer system. A user computing device accesses a search entry web element (such as a toolbar or a web page) from a search engine web site running on a search engine computer adapted to allow a user to enter a search term associated with a desired product inquiry, and then initiates a search by entering a search term into an input field on the search entry web element, the search term associated with a desired product inquiry. The user computing device transmits the search term to the search engine web site over a computer network. The search engine web site uses the search term to perform a search for web pages matching the search term in accordance with certain search criteria.

The search engine web site will then return to the user a plurality of links to web pages determined by the search engine web site to match the search term in accordance with the search criteria. The user computing device connects with a merchant web site associated with a selected link (selected by the user or by the search engine web site), and the user executes a transaction to purchase a desired product from the merchant web site. Notably, the transaction includes tendering at least partial payment for the desired product with a payment component previously accumulated by said user. The payment component may for example be reward points, a rebate, a discount coupon, special offer, cash equivalent tender, etc.

The search criteria may for example include a payment component filter that provides for display to the user of links to web sites that will allow payment for the desired product with a payment component. The payment component filter may provide that links to web sites that will allow payment with a payment component are displayed to the user with highlighted indicia, and/or it may disallow display of links to those web sites that do not allow payment with a payment component. The user may select the payment component filter prior to initiating a search by selecting a designated button control displayed on the search entry web element.

The search criteria may also include a product purchase filter that requires display to the user of links to those web sites that will allow a user to purchase a product associated with the search term. The product purchase filter may provide that links to web sites that will allow a user to purchase a product associated with the search term are displayed to the user with highlighted indicia, and/or it may disallow display of links to those web sites that do not allow a user to purchase a product associated with the search term.

The search criteria may also include an availability filter that provides for display to the user of links to web sites that can provide a desired product based on date and time based availability criteria, and/or it may include a usability filter that provides for display to said user of links to web sites that can provide a desired product based on usability criteria.

The search criteria may include an optimal value filter that provides for display to the user of links to web sites that provide optimal purchase value to the user for the desired product as determined by the search engine web site. The optimal purchase value is determined by the search engine web site in accordance with value criteria (e.g. entered by the user). Examples of value criteria are the purchase price of the product, the availability of a reward component (e.g. reward points, a rebate, a discount, or a cash equivalent tender)) provided by the merchant along with the purchase of the product. The links to web sites that provide optimal purchase value to the user for the desired product may be ranked in order by the search engine web site as determined by the amount of value provided to the user for the desired product. The search engine web site may automatically link the user's computing device browser to the web site that provides the best value for purchase of the desired product.

The search engine web site may provide a toolbar web element that includes a reward points payment button, which when selected will initiate a points payment process. In the points payment process, a points payment request is transmitted from the user computing device to the search engine web site, and then the search engine web site arranges for the redemption of reward points from a reward point account stored on a reward point server on behalf of the user in order to at least partially pay the merchant for the selected product. This may be done by communicating with the reward server computer to determine the number of reward points held in the reward point account on behalf of the user, and then redeeming reward points from the reward point account on behalf of the user, wherein the number of reward points in the reward point account is decreased by the reward server computer and consideration for said redemption is conveyed from said reward server computer to the search engine computer. The search engine computer then arranges for payment to the merchant in exchange for the selected product on behalf of the user.

The points payment process may optionally allow for the search engine web site to arrange for the redemption of reward points from a plurality of reward point accounts stored on a plurality of reward point servers on behalf of the user in order to at least partially pay the merchant for the selected product.

A user profile database may be stored on the search engine computer, which would then use the profile associated with the user along with the search term to perform a search for web pages matching said search term in accordance with search criteria and a profile associated with the user. The user profile database may include for example user product preference data and user demographic information. The search engine web site may also use the user profile to make alternate product searches and transmit alternate product suggestions to the user computing device based on results obtained from the alternate product searches.

The process for exchange of the previously earned reward points comprises the steps of the user requesting the search engine/trading server computer to obtain reward points from a reward server associated with a rewarding entity with which the user has reward points. The reward server computer decreases the user's reward point account by the requested number of reward points. The reward server computer may convey consideration to the trading server computer, where the consideration corresponds in some predetermined proportion to the number of reward points decreased in the account of the reward server. The trading server computer increases the reward exchange account on the trading server associated with the user by the requested number of points.

BRIEF DESCRIPTION OF THE DRAWING

FIG. 3 is a sample of the prior art reward summary from an airline frequent flyer system;

FIG. 8 is a data flow diagram of the user account creation process on the trading server;

FIG. 9 is a data flow diagram of the offer process by a reward program or by a merchant;

FIG. 10 is a data flow diagram of the process where a user may be redirected from a reward program to the trading server of the present invention; and FIG. 11 is a block diagram of the search engine process of the present invention.

DETAILED DESCRIPTION OF THE PREFERRED EMBODIMENT

Figure 1:
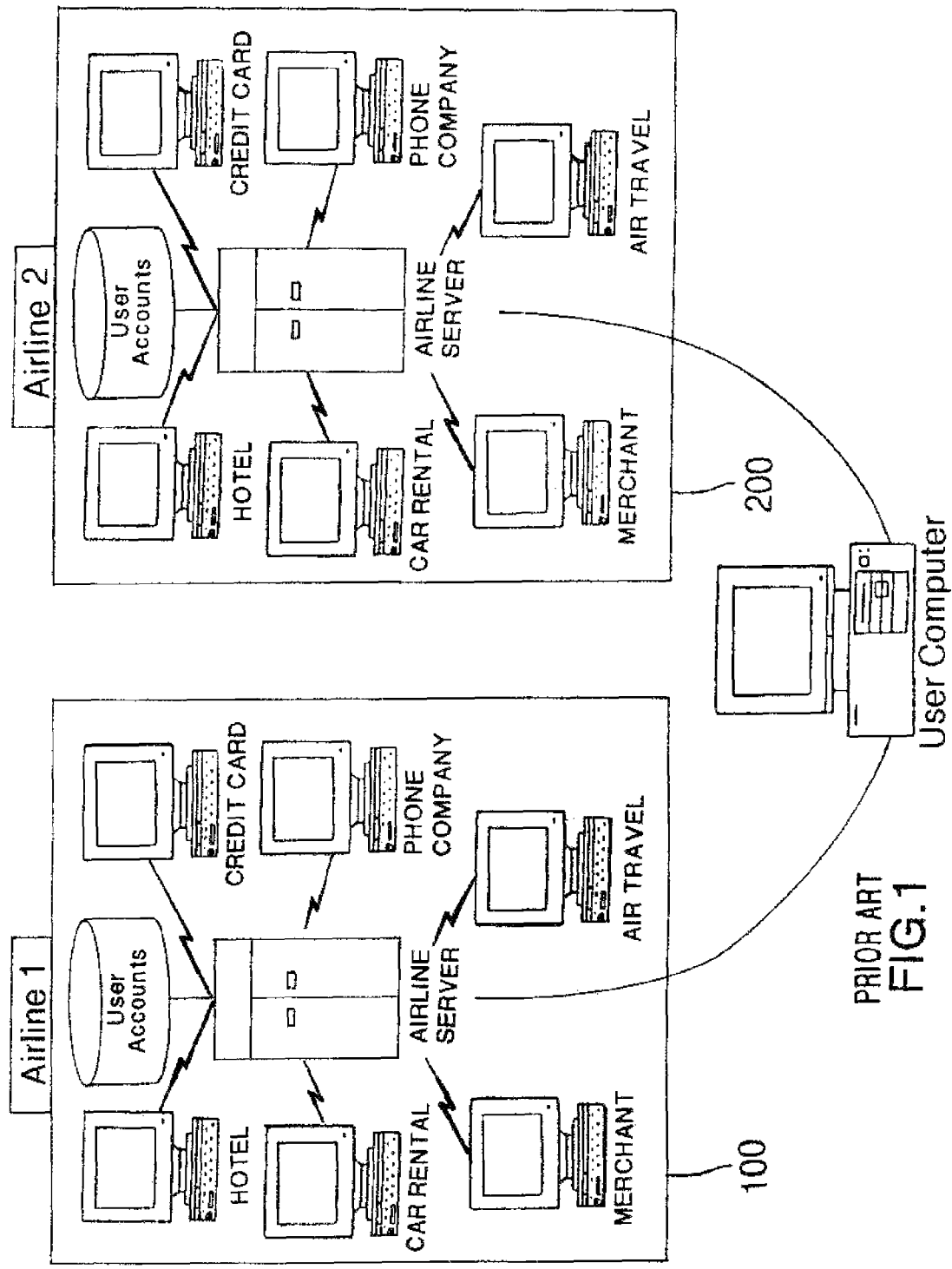
FIG. 1 is representative of the prior art marketing arrangements used in reward programs.
Figure 2:
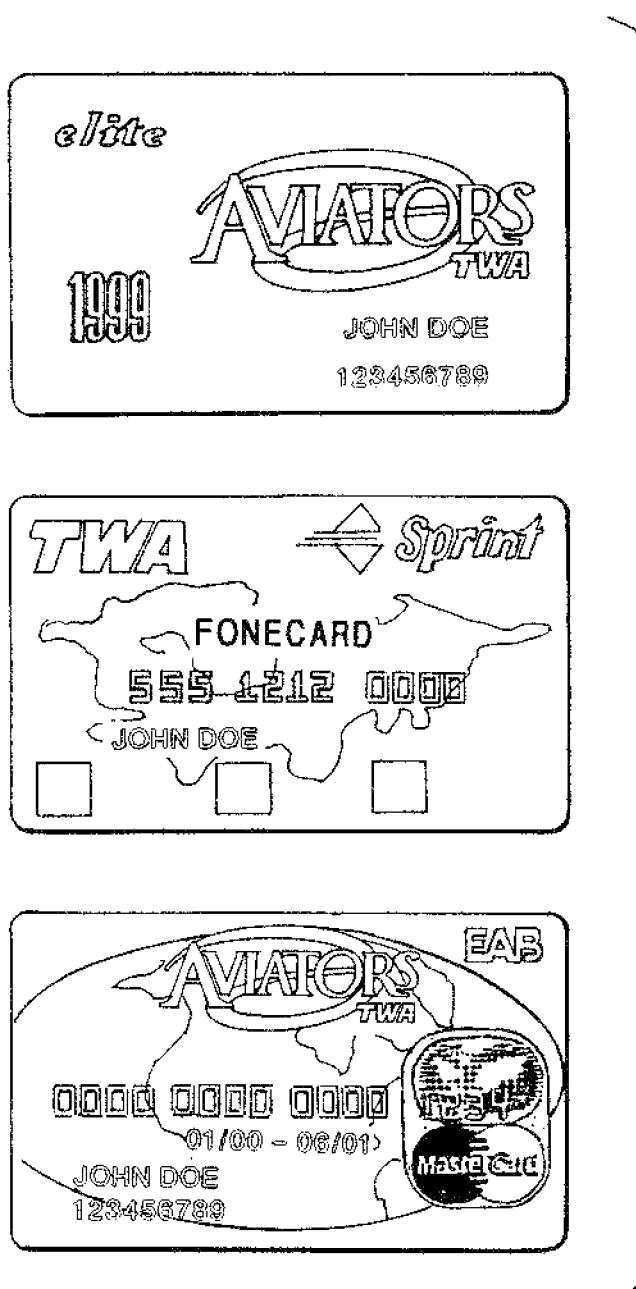
FIG. 2 is a representation of the co-branded partners in a prior art award program.

The present invention implements various methodologies to enable a user to implement a search engine service in an online commerce environment for an enriched product search, review, analysis, and purchase experience. Improvements over prior art search engines have been implemented herein that allow users to perform tasks that generally fall into either of the following two categories: (1) to search for, compare and obtain desired products having a reward component (such as rebates, coupons, discounts, and reward points) associated with the purchase such that users earn the reward component(s) by making the purchase (and contemporaneously redeem them with the purchase, if desired), and/or (2) to search for, compare and obtain desired products that may be obtained in whole or in part by tendering an already-obtained payment component (such as rebates, coupons, discounts, and reward points).

Reward components are becoming more prevalent in today's commerce environment. A reward component provides an incentive to make a purchase since it rewards the purchaser or user by giving him a rebate, discount, or reward points. Reward points, as known in the art, are often awarded by merchants as a reward for making a purchase with that merchant. Various types of reward or loyalty schemes have been implemented, but the general concept is that the customer may earn and accrue reward points based on the amount of money spent at a merchant, and then at some point the customer may redeem some or all of his earned reward points in exchange for a product or a reduced price on a product. A typical example is when a merchant awards one point for every dollar spent with that merchant, so that a customer would spending $1,000.00 would earn 1,000 points. That customer then redeems them at a rate of one penny per point, so that the value of the 1,000 points is $10.00. The merchant would accept the redemption of its points against a product purchase, for example a $15.00 may be reduced in price to $5.00 or the customer may obtain a $10.00 item free of further charges by redeeming his 1,000 reward points.

In the present invention, reward points are logged in a reward point account stored on a reward server computer that is associated with the reward issuing entity (e.g. the merchant). On aspect of the present invention, which is the subject of my U.S. Pat. No. 6,593,640, allows users to trade or exchange reward points into a common reward point account so that they may combine the values of their various (disparate) reward points into one account. Thus, with reference to FIG. 4, a plurality of reward server computers 10, 12, 14, a trading server 20, a merchant computer 30 and a user computer 40 are shown in communication with a network 2. The network may comprise any type of communication process where computers may contact each other. The present invention will be described with respect to an Internet-based network where the reward server computer 10 is associated with an airline frequent flyer program. Any type of reward server may also be used in this system. The reward server computer may be a credit card reward program such as that offered by American Express where the user earns rewards based on purchases, or an advertising based award program where the user earns rewards by selecting advertising content for viewing on the Internet.

A user of this system may acquire and accumulate reward components such as reward points through any prior art means such as shown on FIG. 1, which are then posted in a user's reward point account 52 that is accessible through the reward server computer 10. The trading server computer 20 is in communication through the network 2 with a user on a user computer 40 and is additionally able to connect to the reward server computers 10, 12, 14 through the network 2 in accordance with techniques well known in the art for Internet communications. Alternative electronic communications methodologies may be used, such as an ATM adapted to allow a user to access his accounts, or a smart card reader, etc. The merchant computer 30 is representative of any site that can communicate with the network that has goods or services for sale or trade. The merchant may have a direct relationship with the trading server where the direct relationship allows for a streamlined process for allowing a user to acquire products offered via the merchant computer. Alternatively, the merchant computer may be an independent merchant that does not currently have a profile defined in the trading server that will accept payment from another computer system in any one of well known e-commerce embodiments.

The rewarding entities may be any type of entity that has a service for allocating points or consideration for user actions. The reward server computers 10, 12, 14 may be of any type of accessible server capable of holding data about a user along with a corresponding earned value that is negotiable for other goods, services, or points of another system. In the preferred embodiment, the airline reward server computer 10 may refer to one or several different airlines that have frequent flyer programs or the like. The credit card reward server computer 12 may refer to any type and number of credit card server systems capable of holding, increasing or decreasing a user's earned rewards acquired according to the terms of the credit card program to which the user has enrolled. The marketing reward server computer 14 may refer to one or a multitude of network accessible marketing systems that allow a user to have an account where points or other redeemable value may be stored, updated and redeemed by a user. The trading server computer may be any type of computer system that allows users to access the system in order to perform the processes involved in this invention. In the preferred embodiment all of the systems described are accessible through the Internet and the user may automatically or freely navigate to any site by means well known in the art.

Figure 4:
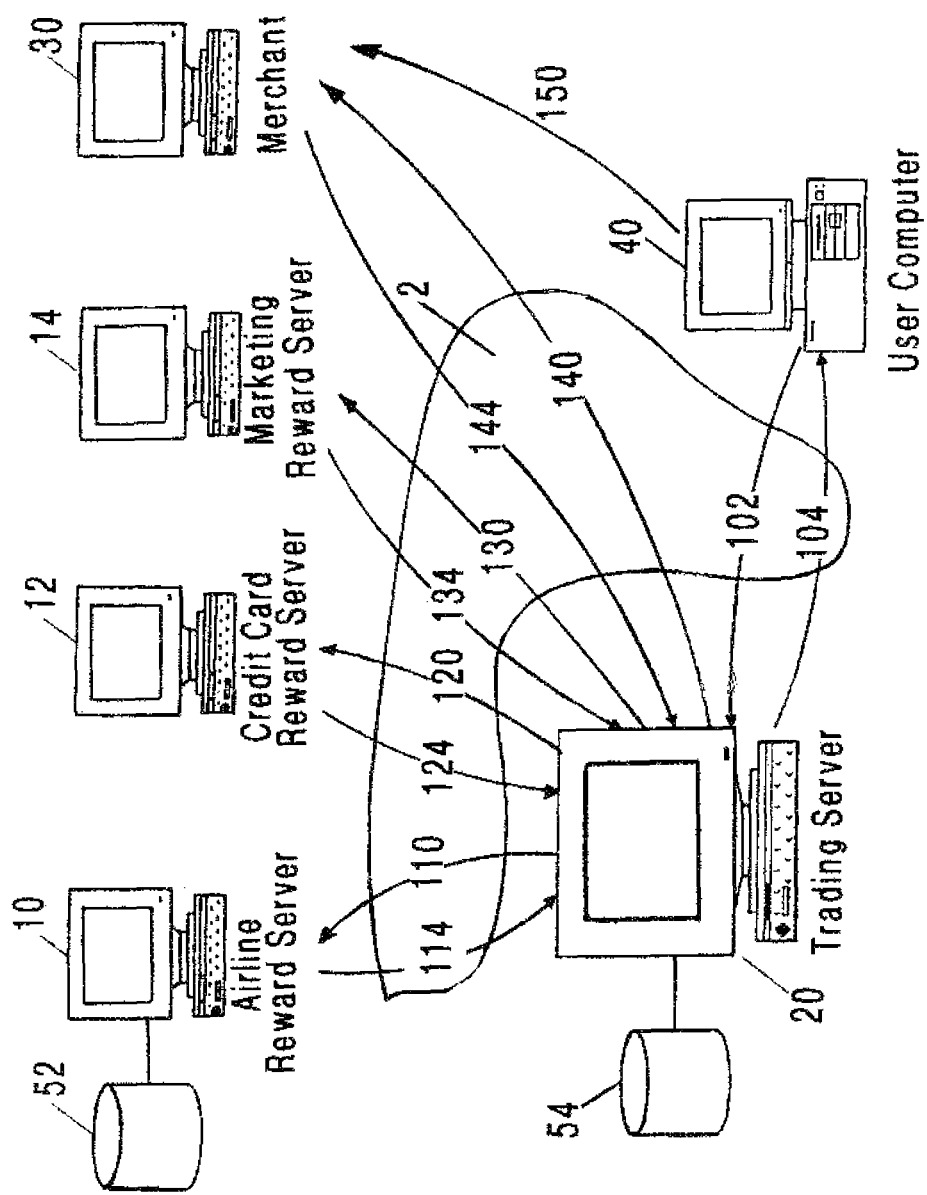
FIG. 4 is a block diagram of the components of the present invention.
Figure 6:
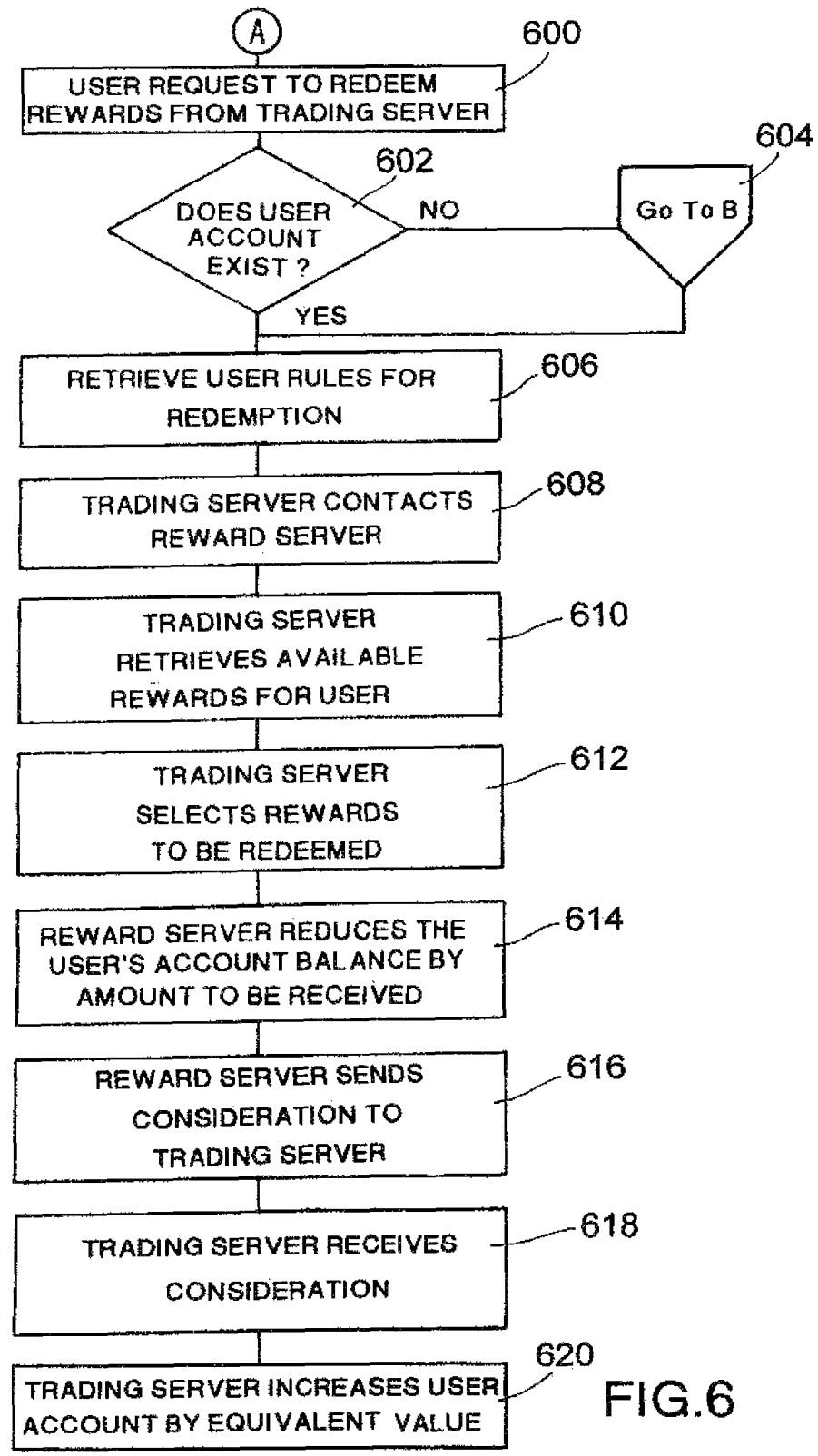
FIG. 6 is a data flow diagram of the process for a user to redeem rewards.

The method of this invention of allowing the user to utilize a search engine web site to find desired products that either (1) provide the user with a reward component as an incentive for purchasing an item, or (2) allow the user to make a purchase with an already-accumulated payment component will now be described with respect to FIG. 11, FIG. 4 and the data flow diagram of FIG. 6. The product search engine process is shown in FIG. 11. In one embodiment, a user is provided with a search engine web element such as a search form page served from the search engine trading server (such as when a user uses the GOGGLE web site http://www.google.com). In the alternative, a search engine toolbar may be downloaded from the search engine computer and executed with the user's web browser as known in the art. In any event, the search entry web element has an input field such as a text entry box for entering the search term as known in the art. Optionally, a web control element such as a button may be provided to allow a user to indicate that the search will be for product purchases only (i.e. with a merchant) rather than just an informational search that may also pull up product reviews etc. For example, a user may enter the term "DVD Player" and select the "Purchases Only" button, and then submit the page to the search engine web site as well known in the art. The search engine will return a list of web links as well known in the art that will redirect the user to a merchant's web site, in particular to a web page that features the desired item (a DVD Player).

The search engine performs the search utilizing the user-entered search term (such as "DVD Player") as well known in the art, but modified in accordance with several aspects of the present invention. In one aspect of the invention, the search engine will implement a set of search criteria that may be set by the user and/or the search engine itself as described herein.

The search criteria of the present invention include a payment component filter, a product purchase filter, an availability filter, a usability filter, and/or optimal value filter. Any or all of these filters may be selected by the user prior to executing the search, for example by selecting buttons on a toolbar, or by selecting check boxes or the like on a search engine web page, etc. In the event that additional information is required (in accordance with the filter selected), then the user will enter such additional information in any manner made available as well known in the art of web page design (e.g. text boxes, check boxes, radio buttons, drop down lists, menus, etc.). After all of the desired filters have been selected by the user, and all appropriate data has been entered, then the user selects a "Search" button to send all search criteria as well as the search term(s) to the search engine web site and the search is initiated. It is also noted that filters may be preset or automatically triggered or set by the user or a third party based on certain conditions as may be defined.

The payment component filter will instruct the search engine to return to the user computing device's browser a display of links to web sites that will allow payment for the desired product with a payment component. As previously described, a payment component is previously-acquired value such as a rebate, coupons, discounts, or reward points. These payment components may be accumulated by a user based on prior purchases with that merchant, such as when a user makes a $100 purchase at RADIO SHACK and is awarded 100 radio shack points, which are logged in an account held on behalf of that user. That account may be increased (based on subsequent purchases) or decreased (based on reward point redemptions) as well known in the art. These payment components may also be accumulated by a user based on prior purchases using a certain credit card, such as when a user makes a $100 purchase using his AMERICAN EXPRESS card and is awarded 100 AMERICAN EXPRESS MEMBERSHIP REWARD POINTS, which are logged in an account held on behalf of that user. That account may be increased (based on subsequent purchases) or decreased (based on reward point redemptions) as well known in the art. By selecting the payment component filter, the user is requesting the search engine to return links to web sites that have already indicated a willingness to accept payment (in whole or in part) in the form of an applicable payment component. These links to web sites that will allow payment with a payment component may then be displayed to the user with highlighted indicia, such as use of a bold, larger-than-normal, or underlined font, which will aid the user in seeing which links will allow use of a payment component such as reward points. Likewise, an option may be set that would list only those links to web sites that allow use of a payment component and disallow display of links to those web sites that do not allow payment with a payment component.

The search engine may determine whether a merchant's web site would allow a user to make a purchase with a payment component such as reward points in any manner known in the art, such as the user of metadata or metatags embedded in the web page of that merchant. That is, by embedding certain keywords, control data or the like in a web page, the search engine can determine if the associated web site of that merchant will allow the use of a payment component. Other methodologies for accomplishing this objective known in the art may also be used for this purpose.

The product purchase filter may be selected by the user to instruct the search engine to return only those links to web sites that will provide for a purchase of the product indicated in the search term. That is, any web site that provides information only (and no product purchase availability) such as a magazine review of the product, would be filtered out of a search with this option selected by the user. This helps the user eliminate the numerous links that would otherwise appear that would not enable the user to make a purchase from that web site. Of course, this is an option since the user may in fact want to be provided with links to such web sites. These links to web sites that will allow purchase of the product may then be displayed to the user with highlighted indicia, such as use of a bold, larger-than-normal, or underlined font. Likewise, an option may be set that would list only those links to web sites that allow purchase of the product and disallow display of links to those web sites that do not allow purchase of the product.

The availability filter may be selected by the user to allow him to input certain desired dates and times, for example when a user wants to purchase tickets to a play and wants to limit his search accordingly. By selecting this filter, additional information will be entered such as a range of available dates and times, a range of unavailable dates and times, etc. Likewise, a usability filter may be employed, which allows the user to specify usability factors that may be implemented by the search engine in its product searches.

The optimal value filter provides for display to the user of links to web sites that provide optimal purchase value to the user for the desired product as determined by the search engine web site. The optimal purchase value is determined by the search engine web site in accordance with value criteria entered by the user. Examples of value criteria are the purchase price of the product, the availability of a reward component (e.g. reward points, a rebate, a discount, or a cash equivalent tender)) provided by the merchant along with the purchase of the product. The links to web sites that provide optimal purchase value to the user for the desired product may be ranked in order by the search engine web site as determined by the amount of value provided to the user for the desired product. The search engine web site may automatically link the user's computing device browser to the web site that provides the best value for purchase of the desired product.

Once the user has navigated through the various web pages found by the search engine and makes a purchase decision, then he will go through a product purchase process. The merchant will have various payment options, including the typical credit card options, and may also have an option to pay for the product with a payment component such as reward points. In particular, the user may be given the option to pay for a product utilizing reward points from a single reward account (such as his AMERICAN EXPRESS MEMBERSHIP REWARDS POINTS), or he may be able to pay for a product utilizing reward points from multiple reward accounts (such as his MEMBERSHIP REWARDS POINTS and his VISA points), or he may be able to pay for a product utilizing reward points from an aggregated reward point account that holds reward points previously aggregated/exchanged from multiple single reward point accounts. This process is described in further detail with respect to a trading server later in this application. In that scenario, the search engine may operate as a trading service as well (i.e. aggregating reward points from various reward accounts and exchanging aggregated reward points with the merchants for the desired products). The search engine/trading server may pay the merchant for the desired product with cash or its equivalent, or it may barter with the merchant by exchanging a user's reward points directly for the product. In any event, the user's individual or aggregated reward points are decreased by a value equivalent to the price of the product (and optionally a service fee charged by the search engine for brokering the transaction).

The user may also be given an option to pay for the product with reward points held by a third party trading server in addition to the search engine itself. In this case, the payment button would trigger a brokerage process amongst the merchant, the user, and the selected trading server that holds the user's aggregated reward points.

As a further embodiment, the points aggregation payment model discussed herein may be integrated with a search toolbar commonly used in conjunction with web browsers. In this case, the toolbar is always present for the user to take advantage of without having to navigate to the home page of the search engine web site. There will be a "Pay With Points" button available on the toolbar to allow the user to pay for a product with rewards points as discussed above. This "Pay With Points" button may be used to transfer points directly to a merchant that accepts points as described above, or it may cause a transaction to occur wherein cash or cash equivalent consideration is transferred from the trading server to the merchant in exchange for the product. This function may operate with any type of merchant, even when not found in a search. For example, a user is navigating a BEST BUY website and sees a DVD player he wants to buy. He goes through the checkout process, but in the event that BEST BUY does not accept points for payment, then selecting the "Pay With Points" button will trigger a transaction between the trading server and the BEST BUY merchant wherein cash equivalent is sent to BEST BUY, the product is shipped to the user, and the user's aggregated reward points account is decremented accordingly.

Moreover, the search results may indicate which vendors provide optimal transactions for the user, based on a user profile that indicates which reward point program(s) the user is a member of. The search results may indicate, for example, that a certain vendor provides a better exchange rate for American Airline points than it does for United Airline points, and since the user has a large number of American Airline points to exchange then that vendor would provide a preferred transaction that is of greater benefit to that user. Likewise, the search results page may indicate that a certain vendor will accept payment for the product completely with reward points, or it may only accept 75% of the price in reward points, etc. This will enable the user to select a vendor that provides an optimal exchange for the user's reward points for a given product. This information is of great value to a consumer in addition to learning just the purchase price, since a more expensive price may actually be more beneficial if the vendor accepts a greater ratio of points. In addition, the search results may indicate if a vendor will accept additional points that may be used for a donation to a charitable organization, rather than only for a purchase of a product, such that a tax deduction may be taken by the vendor (and/or the user) for donation of the reward points.

In another aspect of the present invention, a user is able to perform a search via the search engine web site using a reward component filter; that is, for certain products that have a reward component offer associated with that product. Reward components include but are not limited to coupons, rebates, reward points and the like. This enables users to determine if the purchase of a certain product from a certain merchant will be accompanied with a rebate, coupon reward points, etc. The user is also able to make comparisons to products from merchants that do not provide such value added offers and determine which offer presents the best terms for the user. For example, the user may be able to determine if any merchants are offering discount coupons or instant rebates that may be used to reduce the purchase price, which merchants may be offering reward points for the purchase of the product, and which merchants do not provide and such offers.

As previously indicated, the offer may be flagged as having a reward component offer associated with it by the use of an embedded flag or marker (e.g. metadata) that signifies the reward component offer to the search engine. Other types of intelligent methods for extracting desired information that are used by search engines in the art may also be employed by the present invention.

The search engine functionality of the present invention also allows a user to make a comparative analysis between similar (but not identical) products in making a purchase decision. Thus, the user may compare similar but not identical DVD players from various merchants to make an informed purchase decision. The search engine may also function to present all comparable product offerings and make recommendations as to the best price, the best value, the best product, or any combination of these factors.

Reward components, although typically obtained from a single merchant, may also be obtained from multiple merchants, for example when two merchants are co-branded in a transaction and offer a reward component usable with (1) either merchant independently or (2) only both merchants combined. For example, an offer may be made wherein a purchase of a MCDONALD's hamburger will yield a reward component of a COCA-COLA soda.

The search engine service will have analytical tools that will enable it to determine the resources that may be required to obtain a product requested by the customer as well as resources that may be available to that customer such as from other users. For example, the search engine/trading server may be able to determine that another registered user has reward points accrued from a certain merchant that would be useful for the customer to utilize in its product purchase, and then broker an exchange between the users that would be beneficial to both users. User A may have a large number of frequent flyer reward points with American Airlines and be glad to trade them or sell to them to User B, who may need them for a special offer from American Airlines.

The search engine service of the present invention is configured for interaction and interoperability with other search engines. This would allow the search engine to benefit from external resources that would be otherwise unavailable. For example, another search engine service may have preferred access to information and then be able to transfer that preferred information to the present search engine. Also, searches may be handed off to alternative search engines if the (primary) search engine is unable to handle the search (e.g. if search request traffic is high at a given time). Likewise, searches may be executed in parallel be multiple search engines and the results collated for presentment to the user.

The search engine of the present invention may feature advertisements that are based on a search engine rating system. Various colors may be applied to signify various purchase values (e.g. red for an offer of high consumer value, blue for lower value, etc.)

In an alternative embodiment, a portable device such as a personal digital assistant is equipped with wireless Internet access through one or more of various known technologies. A user may input search criteria or may use automated data entry such as a bar code scanner, which is then fed wirelessly to the search engine, and the results are displayed on the screen of the PDA for the user to act on.

Revenue may be generated by the present invention in one or more of several manners. A transaction-based fee may be charged by the search engine service to users for (1) executing a search, (2) viewing results, (3) linking to selected search results, (4) executing a purchase transaction, (5) making a reward point exchange, and/or (6) redeeming reward points. Merchants and/or reward issuing/holding entities may also be charged transaction fees. Merchants or other advertisers may be charged insertion fees for placement of advertisements. A license or subscription fee may also be charged by the service to user, merchants, advertisers, reward point issuers, reward point exchangers, etc.

The search engine service of the present invention allows for users to interact in a bidirectional manner with merchants. That is, in known search engine scenarios, a user will find a link of interest and click through to the merchant's web site associated with the link. The user may then browse that webs site and make a purchase based on the price provided by the merchant on the web page the user is viewing. In the present invention, the user is able to make a counteroffer to the merchant whereby a reduced price may offered and then accepted (or not) by the merchant.

In another embodiment, the user may enter requests for certain products or rewards, and if the product or reward is not currently available, then the search engine service may store that request and notify the user when such product or reward becomes available. Optionally, the desired item may be held on reserve for a certain time period on behalf of the requesting user.

The search engine may allow for a user to specify certain destinations or other geographic search parameters so that the search will be limited to those parameters. This is particularly useful where the user anticipates that he will want to physically visit the location of the merchant, or where the shipping costs will likely be high and the user wants to purchase the product from a relatively close-by merchant, etc. In this case, entering geocentric terms will help the search engine user limit the search results accordingly.

A real-time availability counter or other type of graphic indicator may be used on the search engine web page to indicate to the user the number of products that are available in inventory so that the user will have that information instantly available. For example, there may be a number shown that may change as inventory is depleted, or a bar graph may be used, etc.

Figure 5:
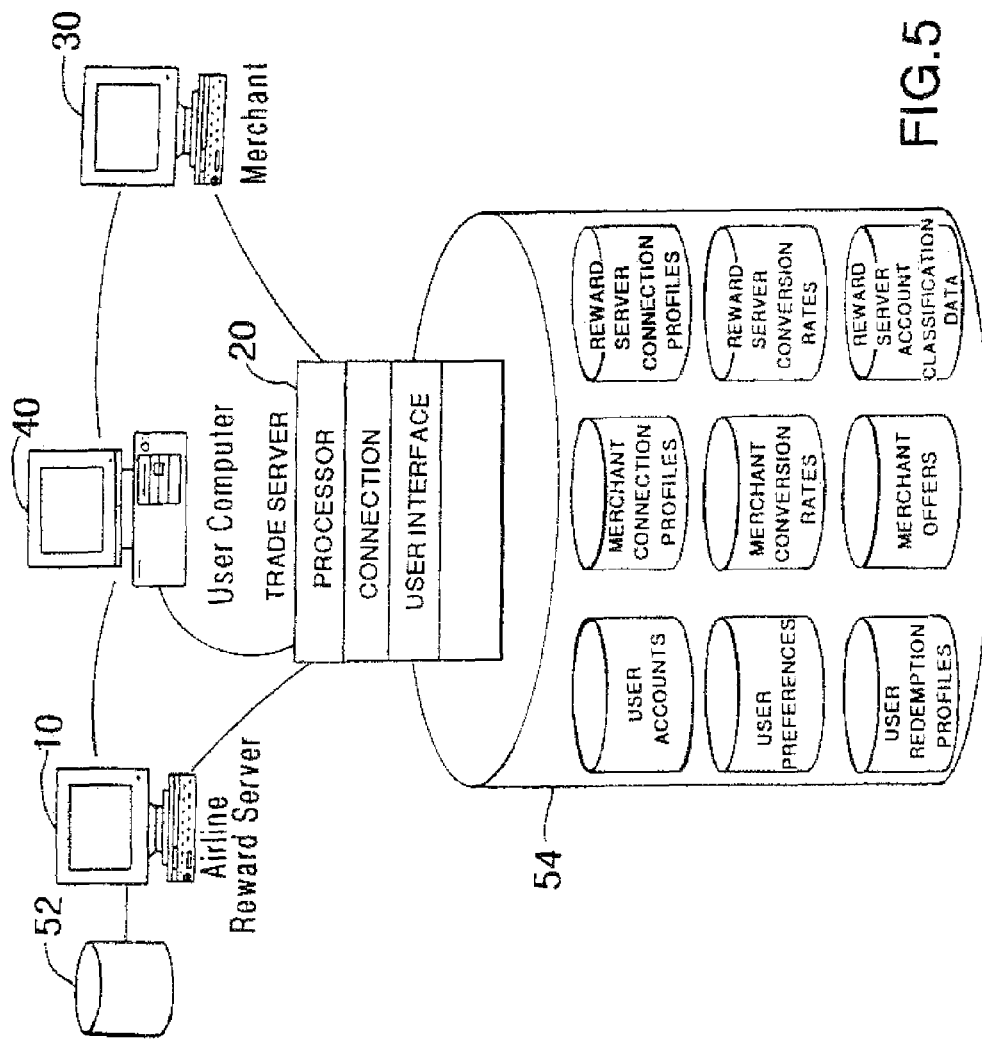
FIG. 5 is a block diagram of the system components of the present invention.

As previously mentioned, a user is able to aggregate reward components (such as reward points) previously earned in various individual reward accounts into one reward exchange account stored on the search engine computer, or on a third party reward point exchange computer (also referred to as a trading server computer). That is, a user is able to exchange or trade previously earned reward points in order to maximize their value to the user. The following description of the functionality of the trading server computer applies regardless of the actual location of the trading server software (i.e. on the search engine computer or another computer). The trading server computer allows users to "log in" to access the functionality provided where the user may interact with applications, forms or controls. For example, the user may view his account information by using a web browser which may automatically select or allow the user to enter the appropriate identification information and then select buttons, links or other selectable objects to navigate to the part of the system desired. In the alternative, navigation may be done automatically by the web site, and thus be transparent to the user (i.e. not directly controlled by the user). If the user does not yet have an account (step 602), then the user may be enrolled per the flow diagram of FIG. 8 (step 604) as discussed below. The user, from the user computer, makes a request to the trading server computer 20 via communications flow 102 (step 600), requesting redemption through the network 2 for either all or a portion of the pre-accumulated reward points stored for the user in one of the rewarding entities. A user's reward point account 52 is associated with each of the reward servers but is only shown in FIG. 4 connected to the airline server for sake of clarity. Communications are made by the trading server 20 to the user computer 40 via communications data flows 104. The user may interactively select rewards to be redeemed, or the system may determine which rewards are to be redeemed based on a previously defined user profile rule or other third party profile rule (such as an issuer) (step 606). The trading server computer 20 "obtains" the reward points balance information from a reward server 10, 12, 14 stored in the user's account 52 by contacting the appropriate reward server via communication flow 110 (step 608) according to the user's requirements, by using the connection parameters as defined in a database 54 on the trading server as shown in FIG. 5. In one embodiment, the trading server retrieves reward point account balance information via communications flow 114 (step 610) from the reward server for the user. In another embodiment, the trading server transfers as part of the communication 110, the requested reward points to be redeemed (step 612). The reward server computer 10 decreases the user's reward point account 52 by the requested number of reward points (step 614). The term point is used to reference any earned value that has a cash equivalent or negotiable worth as in "frequent flyer" point or mile. The reward server computer 10 conveys consideration to the trading server computer 20 where the consideration corresponds to the number of reward points decreased in the user's account 52 on the reward server 10 (step 616). For example, the consideration may be in the form of a monetary credit to an account that exists between the trading server and the reward server, that gets paid at the end of a predefined billing cycle (i.e. every month) or in real time or upon execution of a trade or redemption procedure. The trading server computer 20 increases the reward exchange account 54 associated with the user by the received number of points (step 620). The trading server computer 20 in turn, receives the consideration from the reward server computer 10 (step 618).

Similar communications are made between the trading server 20 and the credit card reward server 12, as indicated by the data communications 120 made by the trading server 20 to the credit card reward server 12 and the data communications 124 made by the credit card reward server 12 to the trading server 20. Likewise, communications are made between the trading server 20 and the marketing reward server 14, as indicated by the data communications 130 made by the trading server 20 to the marketing reward server 14 and the data communications 134 made by the marketing reward server 14 to the trading server 20. In each case, the trading server 20 increases the user's reward exchange account 54 by the received number of points from the credit card reward server 12 and the marketing reward server 14, respectively.

Figure 7:
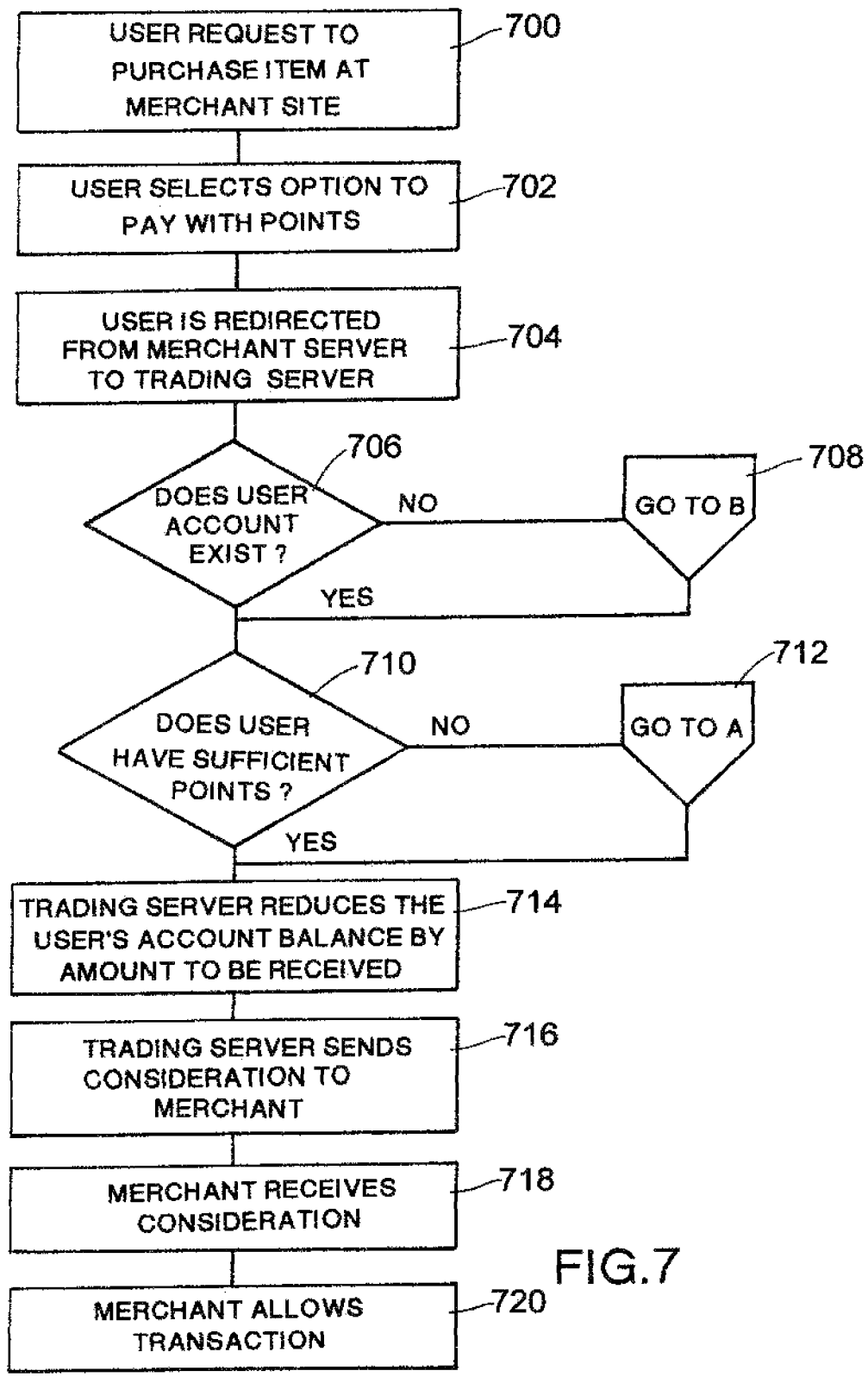
FIG. 7 is a data flow diagram of the user request for purchase of an item at a merchant site.

In the second part of the transaction (see FIG. 7), the user from a user computer 40 may make a request 150 to purchase an item from an associated merchant computer 30 (step 700) which the user may access as a result of executing a search with the search engine web site as previously explained. In the preferred embodiment, the merchant computer system will be a networked computer system accessible via the Internet. The user would visit the merchant site by selecting on a link from the search results page. The user may identify one or many items to be acquired from one or several merchants 30. The user elects to pay for the desired item with a reward component such as reward points (step 702), and the user is redirected from the merchant server to the trading server at step 704. If the user does not have an account (step 706) then the user is enrolled per the flow diagram of FIG. 8 (step 708). The merchant server computer 30 would confirm that the user has sufficient reward points or other reward value to purchase the selected item by communicating with the trading server 20 via communication flows 140, 144 in order to check the user's reward exchange account 54 (step 710). (Optionally the user may decide to effect payment with reward points from single reward point source, such as with his AMERICAN EXPRESS MEMBERSHIP REWARDS points.) If the user does not have enough points in his reward exchange account at the trading server 20, then the process of trading more points from the user's reward point account 52 into his reward exchange account 54 is executed by branching to the flow diagram at exit point A (step 712) which brings the process to the flow diagram in FIG. 6 discussed above. After enough points are traded, the user continues with the process from step 712 as shown in FIG. 7. The user may also borrow additional points to make purchases. The trading server computer 20 would request the merchant computer to deliver the item to the user. The user delivery information may be retrieved from the trading server computer 20 or may be supplied in some other manner. The trading server computer 20 would decrease the user exchange account 54 by the number of points or value corresponding to the purchased item (step 714). The trading server computer 20 conveys consideration (or instructs a third party to convey consideration) to the merchant computer 30 equivalent to the cost of the item by means well known in the art of electronic commerce (e.g. by a preexisting account, credit card, etc.) (steps 716, 718). In the alternative, the consideration may be a direct transfer of points to an account associated with the merchant. The merchant then completes the transaction at step 720, for example by delivering the purchased item. A transaction fee may be charged by any of the parties in the form of points, cash or cash equivalent, etc. Also, a delivery fee may be charged for delivery of the product.

Policies and profiles may be established to automatically contact each of the reward servers according to a user profile, merchant profile, broker dealer profile, issuer profile, or product provider redemption profile (see FIG. 5) to transact the required payment for an item selected by a user. This profile may indicate the order of redemption and method of providing funds sufficient to cover the purchase after redeemable points are exhausted. For example, if a user has a preferred air carrier where the user would like to retain mileage in that reward system, the user may specify a priority of use indicating the reward resources that should be exhausted prior to accessing the most desirable rewards. Following the selection of an item to be acquired, the server may contact all of the reward resources according to this profile to selectively redeem each as required to meet the purchase price. The process may be performed in real time or as a background process transparent to the user where the user may select how the transaction should proceed. If the user exhausts lower personal worth resources from the reward servers, the system may be required to contact the user before the transaction is allowed to proceed to redeem points. A classification system may also be used to indicate rewards of similar worth or category. If for instance, a frequent flyer program supports multiple classifications of miles that may be redeemed differently, the user may optionally define how those resources should be managed during redemption. The redemption process would then honor those rules elected by the user to select from several different reward programs instead of redeeming rewards strictly on a value required from the first reward program contacted or based upon a preferred hierarchy defined by the system or its members.

FIG. 8 describes the process steps involved in enrolling a user to utilize the trading server. The user accesses the trading server 20 at step 800 and selects an option to create a user account at step 802. The data entered by the user may be used in determining whether a user allows unsolicited offers to be presented from the trading server. In addition, offers may be provided in an automatic fashion without user interaction. The user's preferences for manufactured goods services, products, travel destinations, hobbies, interests or any other user entered criteria may be stored in the database for subsequent use by the system (steps 804 and 808). The trading server has the ability to receive offers from reward servers or merchants (steps 806 and 808) which may then be directed in real time to users based on the database profile information provided by the user or other third party (e.g. an issuer, merchant, etc.) (see FIG. 9). At step 900, the reward server contacts the trading server with an offer to redeem points. Similarly, a merchant may contact the trading server with an offer to be distributed to members (step 902). The trading server records the offer in a database (step 906), and the trading server may record a limited conversion rate in its database (step 906). The reward server may then contact the user with an offer to redeem at step 908. Optionally, the process may branch to the flow diagram in FIG. 6 discussed above (step 910).

The trading server may also be contacted in response to a button or hyperlink located on a web page accessible by the user from the airline reward server (FIG. 10, steps 1000 and 1002). The process may continue to that described with respect to FIG. 6 for trading points into a reward exchange account (step 1004). In a similar manner, hyperlinks or calling routines may allow a user to access a reservations system or merchant from the trading server. The link would direct the user to partner or associated air carriers where the points in a user exchange account on the trading server 20 may be used to acquire hotel accommodations, special offers, reduced fare or free flights.

The system used to implement the aforementioned method will now be disclosed with respect to FIG. 5. The system is comprised of a trading server computer connected to a network of computers where a user interface is established whereby a user from a user computer may access the server to request the transaction to contact a reward server computer system. In the preferred embodiment, the server has memory means for storing the user account information, user profiles and rules which may be specified by the user, system, or merchant. The trading server also has communications means to allow users to access the server and to allow the trading server to contact reward servers and processing means to interpret the rules and coordinate the contact to the respective servers. The processing means is adapted to allow the user to request and exchange consideration for rewards from reward servers. The processing means additionally is adapted to coordinate the exchange of consideration and increase or decrease the user exchange accounts stored in memory in response to actions performed by the user computer, reward server and merchants and issuers.

In the preferred embodiment, the memory means comprises a database structure that is used to record the transactions associated with the previously described method. Records indicating the changes and current value of user exchange accounts are updated according to the request processed by the processor. This invention also implements the recording and subsequent reporting of factors such as the average redemption value redeemed to date, the rate of redemption, and other liquidation liability factors.

In response to a request for exchange or redemption, the trading server looks up the contact properties of the reward server to be contacted. The user information is submitted to the reward server to display the available points that may be redeemed. In another embodiment, the request additionally contains a value to be redeemed. The processor establishes a communication link with the reward server and a transaction request is sent to the processor of the reward server. The processor of the reward server may perform actions that may allow or refuse the requested action, or suggest an alternative action. In another embodiment, the trading server processor may be granted direct authorization to modify the user's records in the reward server database without analysis by the processor of the reward server. A conversion rate may be applied to the transaction such that the reward server reduces the available rewards or value in the user's account. The reward server then transfers consideration to the trading server that corresponds to the value reduced or available in the reward system. In response to the receipt of the transfer or approval of the transfer, the trading server increments the user account balance to reflect the received consideration and the connection to the reward server is terminated. A transaction log may be used to record each of the transactions in case a reconciliation process is required at a later time. The new value, whether increased or decreased in the user's exchange account may then be stored until a user finds an item to be purchased.

The user selects the desired object from the merchants by performing a search for the type of product or service to be procured. In one embodiment, the trading server contacts the merchant server to return to the user a list of products that match the user's search criteria or if the user had specified in detail what was desired, the product may be directly acquired from a merchant or broker/dealer. A communication link is established between the trading server and the merchant computer or designee for e-commerce. Direct acquisition may be enacted by contacting the merchant or broker/dealer computer and supplying the user indicia, the product indicia, and the redemption value sufficient to secure the transaction. In response to the transaction request, the merchant computer or broker/dealer will receive the consideration supplied and contract for the delivery of the product. Unfulfilled requests are stored and when available can be pushed to the user. In another embodiment, the consideration required for the item selected is sent to the trading server where based on the available points in the user's exchange account the trading server will determine whether the consideration is available. An authorization process may be incorporated at this point to request authorization from the user or in a more simplified process, the consideration will be transferred to the merchant computer and the user's exchange account will be reduced. The merchant computer will receive the consideration and will effectuate a delivery transaction to be issued.

The goods may also be placed under direct control of a distribution arm of the trading service so that the user places the order with the trading service directly and the merchants are not directly involved with the sale of the goods.

In a situation wherein the user finds it necessary or desirable to return a product, such as when the product may be damaged, then provision is made for the restocking of points back into the user account (rather than a cash refund), with an optional restocking fee being charged to the user in the form of points.

Thus, the present invention provides a liability management system for issuers of reward points, which allows them to take points off the books and eliminate them, if desired, at a discounted rate. This system enables the sale or repurchase of points with a trading strategy in which points need not expire, or may be retired at a controlled rate or value. The value ascribed to the points (the par value) may be changed by the points issuer/aggregator based on the rate of redemption of the points with respect to the issuers ability to maintain cash flow. That is, the par value of the points may be varied by the points issuer, after issuance, based upon factors such as the rate of redemption of points by other users. For example, if the rate of redemption becomes excessively large, this may negatively impact the cash position of the issuer since points redemption generally results in cash flow out of the issuer to product and service providers. Thus, when an issuer determines that the cash flow is excessive, it may reduce the par value such that subsequent redemptions will result in a lower cash flow rate.

The present system may be implemented by means of a smart card (or credit/stored value card) wherein frequent use points may be accumulated on the user's card every time the card is used for associated application. For example, if a user uses his smart card to pay for a hotel that normally gives reward points, those reward points may be stored on the smart card. Likewise, when the card is used for the purchase of an airline ticket, the points would be added to the smart card. The user may then redeem the accumulated reward points by inserting the card into a reader associated with a computer connected to the Internet or other authorized communication system (e.g. an ATM or other reader). The trading process proceeds as described above, except that the points are obtained directly from the smart card or system rather than a reward server. Information provided to the user regarding the user's reward points is updated after every transaction.

The user may have a credit card, debit card, or stored value card that is linked to their points account in such a way as to permit them to pay for purchases with a merchant by using the card, wherein the merchant uses the existing credit card payment infrastructure as if payment were being made/authorized by a bank linked to the credit card or debit card account, but in fact the card may be linked to the user's points account. In this manner, the user and merchant can use the points account to pay for purchases in a seamless manner whereby points are used for consideration rather than or as a supplement to cash and traditional credit.

Other aspects of this invention will now be disclosed that will enhance the reader's understanding of the application of this invention.

Merchandisers also benefit from the use of this system where another marketing channel is afforded for products that are often purchased by frequent travelers with high disposable income. Products and services encompassing jewelry, flowers, limousine transport, timeshare rental may be exchangeable for points stored in this system. Items purchased through the system may also be paid for by a combination of points and currency which might be the case when a user does not have enough accrued points to meet the purchase consideration of an item selected. There may be designations where a percentage of the product may be paid with points, with the rest in cash or cash equivalent.

It is anticipated that high quality limited access products may benefit from the distribution methods afforded by this system. For example, companies like SONY and Chanel may take advantage of this distribution means without impacting the level of quality or excellence associated with their products.

Manufacturers can discount or liquidate goods for points in a manner that doesn't negatively affect the perceived value of the goods (i.e. not in direct competition with the mainstream sales). That is, the manufacturer can place overstocked, end of run type goods and the like, place them in the chain of distribution for exchange with points, and not be in direct competition with cash sales of its mainstream products.

Resort destinations that are managed by property management companies such as RCI may be integrated into this system where instead of trading accommodations with only those having similar property, it is now possible that the rental of the property may be achieved by conversion for points or points plus a property timeshare or a percentage of cash. Rooms may be booked with discounts that vary in accordance with the number of rooms available, which can change in real time as per the changing availability of rooms.

Offers may be distributed to users of this system where substantial rebates or reduced rates are described in the offer. Time sensitive product offerings can also be accommodated in the system where the value of the product is decreased according to a life span of the product. Time sensitive product offerings such as food products or concert tickets, airline departures, hotel room rentals and the like can have an associated diminishing or escalating value based on the length or availability of the offer. This invention may be used to provide hotel rooms such that when rooms are available and the date of use approaches, the rental price may decrease (the same methodologies may be used to sell advertising space that is time-sensitive).

Using this system it is now possible to coordinate the products of several different providers into one package. A user of this system may therefore select an airline, hotel, car rental and Broadway show tickets in New York, individually or in a prepared package from one location by trading points where the package may not have existed before where the trading system coordinates all aspect of the transaction and reduces the user's exchange rewards in a corresponding manner.

A purchasing club or group may utilize the present invention in order to purchase items in bulk. For example, a transaction may be configured wherein a purchasing club can obtain 100 TVs at a substantial discount, if and only if they agree to purchase all or a substantial portion of them.

Other purchasing leverage not specifically addressed previously may also be acquired by combining the power of a pool of users of this system where these users may be allocated access to products or services not generally distributed to the remainder of the system users. Points collected in the system by these users may afford them access to limited distribution channels where higher discount levels or premium products may be acquired. Direct access to cartel or special club products such as diamonds, bulk or price-advantaged products, duty free items and other restricted access product or service offerings are also accommodated through the coordination of the trading server with these specialized service and product providers. For example, a preferred client distribution channel such as found in a European market for luxury goods would be made available to users of this system where the prices for the objects in this preferred channel may be significantly lower than retail for objects that are typically reserved for limited distribution at premium prices. The trading server may additionally have exclusive rights to allocate access to certain premium products, services, events, travel destinations or accommodations in accordance with any right or grant permitting such allocation to any user of the system. A distribution channel may make available exclusive products for all or a limited amount of the members of the system where the trading server system controls access to the offer. Parameters associated with the available quantity, duration, exchange rates, etc may be input into the system to be used in the allocation algorithm to restrict the offer. Upon user access, the trading server would, in these cases, modify the premiums offered to reflect the immediately attainable items for the current user and may additionally display or provide access to premiums that may be acquired through payment by other means (i.e. cash, charge, debit) to make up the difference between the user's available points and the points required to accept the offer.

In one embodiment, the present invention utilizes a graphic on a web page that shows the availability of an item, such as the number of items left (or about to expire) for a given offer—similar to a running meter. This meter would be updated in real time so that a user would know when the offer will soon be expired due to unavailability of an item.

In another embodiment of this invention, airlines seeking to provide higher levels of personalized service for their business travelers will provide access to the Internet or access to in-flight services such as video games, for a fee or in place of granting mileage rewards on transcontinental or transatlantic flights. Access to video games or other services (e.g. meals and drinks) may be afforded to the traveler where the availability of different games depends on the number of reward points traded in by the traveler. The rewards may be converted using the trading server of this invention, where the user may opt to forego collecting mileage in return for accessing onboard entertainment provided in a standalone mode or in a linked mode. For example, users may select to play video games, access the Internet or utilize Email via a seatback or tray table mounted interface and controller. The user may optionally connect a laptop computer to an interface port of the aircraft using an Ethernet, parallel, USB connection or proprietary connector provided by the air carrier. In the preferred embodiment, the user would select the connection speed and type for communications based on whether in-flight or external services were to be accessed. Other types of business services may additionally be used and accounted for, such as using network printers or fax equipment. RF, satellite or microwave based communications may be used for real time communications where sufficient geographical coverage is provided.

The interface would allow a user to login using the frequent flyer account information or preferably, the trading server account login id and password, where the user may use points awarded from another air carrier or point server to "pay" for the services accessed. The account balance from the trading server may be transferred to the local controller prior to takeoff for each user that logs in to the trading server. Once the plane has departed, depending on the linking or access capability afforded by the air carrier or service provider, the user's account may be modified in real time or upon reconnection following landing, based on services selected by the traveler. If a real time link is supported, the user's exchange account may be periodically debited according to the services selected and duration of use, certified against the passenger log.

In another embodiment, the value of the reward points may fluctuate as a function of the company's performance, which may be measured by reference to the price of its stock, revenue, earnings, or some other parameter that is agreed to that reflects the relative performance of the company The number or value of points outstanding being redeemed also may also be a factor). In this manner, companies that perform well would provide an additional incentive to a user for using their frequent use program rather than a competitor's program. For example, all other parameters being the same, a user would likely choose the Acme credit card company over the Beta credit card company when the user determines that the Acme company performance results in a 10% increase in the value of points otherwise earned by using its credit card. The value may also fluctuate as a function of the number of points outstanding or the desirability of the issuer to reduce its liability or make it more robust.

In a further embodiment, the present invention may be utilized to allow users to pay for items won in an auction with points aggregated as described above. In this embodiment, a user may participate in an auction, such as one of many known auction services executed over the Internet, whereby a user selects an item that he or she would like to bid on from a web page provided by a merchant computer web site, or even by a web site hosted by the trading server computer or a third party auction service provider. The auction may be carried out in any number of well known ways, such as for example when all bidders may bid up until a date and time when the auction ends, and the highest bidder or group of bidders wins the auction. The winning bidder may then designate reward points from his or her reward points exchange account to be used to pay for the item bid for and won in the auction. The accumulated reward points are selected by the user, and consideration is conveyed to the merchant/seller in exchange for the auctioned item as described above.

I claim:

1. A computer-implemented method for an online purchase transaction computer to enable a user to execute an online purchase transaction over a networked computer system comprising the steps of:
  a. an online purchase transaction computer providing to a user device an option to cause payment to be made to a merchant computer for a product selected for purchase by the user device at least partially by reducing rewards from a designated user reward account stored on behalf of the user on a reward server computer that is different from the merchant computer;
  b. the online purchase transaction computer receiving from the user device a payment request to pay for the selected product, said payment request comprising an election of the option to cause payment to be made to the merchant computer for the selected product at least partially by reducing rewards from a designated user reward account stored on behalf of the user on a reward server computer that is different from the merchant computer; and
  c. in response to receiving from the user device the payment request comprising the election of the option to cause payment to be made to the merchant computer, the online purchase transaction computer communicating with the reward server computer to arrange for the reduction of rewards from the designated user reward account in order to at least partially pay for the selected product by (i) requesting the reward server computer to reduce the rewards in the designated user reward account by a designated amount; and
(ii) receiving from the reward server computer consideration corresponding to the rewards reduced in the designated user reward account; and
d. the online purchase transaction computer conveying consideration to the merchant computer to at least partially pay the merchant computer for the selected product.

2. The method of claim 1 wherein the rewards comprise reward points issued by a credit card issuer based on prior purchases with a credit card.

3. The method of claim 1 wherein the payment request received by the online purchase transaction computer additionally comprises an election to pay for the selected product at least partially by reducing rewards from at least one additional designated user reward account stored on behalf of the user on an additional reward server computer that is different from the merchant computer; and wherein the online purchase transaction computer, in response to receiving the payment request, additionally communicates with the additional reward server computer to arrange for the reduction of rewards from the additional designated user reward account in order to at least partially pay for the selected product by
(i) requesting the additional reward server computer to reduce the rewards in the additional designated user reward account by an additional designated amount;
(ii) receiving from the additional reward server computer consideration corresponding to the rewards reduced in the additional designated user reward account;
and conveying additional consideration to the merchant computer to at least partially pay for the selected product.

4. An online purchase transaction computer adapted to enable a user to execute an online purchase transaction over a networked computer system, said search computer comprising processing circuitry programmed to:
a. provide to a user device an option to cause payment to be made to a merchant computer for a product selected for purchase by the user device at least partially by reducing rewards from a designated user reward account stored on behalf of the user on a reward server computer that is different from the merchant computer;
b. receive from the user device a payment request to pay for the selected product, said payment request comprising an election of the option to cause payment to be made to the merchant computer for the selected product at least partially by reducing rewards from a designated user reward account stored on behalf of the user on a reward server computer that is different from the merchant computer; and
c. in response to receiving from the user device the payment request comprising the election of the option to cause payment to be made to the merchant computer, communicate with the reward server computer to arrange for the reduction of rewards from the designated user reward account in order to at least partially pay for the selected product by
(i) requesting the reward server computer to reduce the rewards in the designated user reward account by a designated amount; and
(ii) receiving from the reward server computer consideration corresponding to the rewards reduced in the designated user reward account; and
d. convey consideration to the merchant computer to at least partially pay the merchant computer for the selected product.

5. The online purchase transaction computer of claim 4 wherein the rewards comprise reward points issued by a credit card issuer based on prior purchases with a credit card.

6. The online purchase transaction computer of claim 4 wherein the payment request received by the search computer additionally comprises an election to pay for the selected product at least partially by reducing rewards from at least one additional designated user reward account stored on behalf of the user on an additional reward server computer that is different from the merchant computer; and wherein the online purchase transaction computer, in response to receiving the payment request, additionally communicates with the additional reward server computer to arrange for the reduction of rewards from the additional designated user reward account in order to at least partially pay for the selected product by
(i) requesting the additional reward server computer to reduce the rewards in the additional designated user reward account by an additional designated amount;
(ii) receiving from the additional reward server computer consideration corresponding to the rewards reduced in the additional designated user reward account; and conveying additional consideration to the merchant computer to at least partially pay for the selected product.

* * * * *